July 10, 1923.
D. CHIDLOW
1,461,703
METHOD OF TREATING GRAIN GERM AND SCUTELLUM
Filed May 2, 1923   2 Sheets-Sheet 1
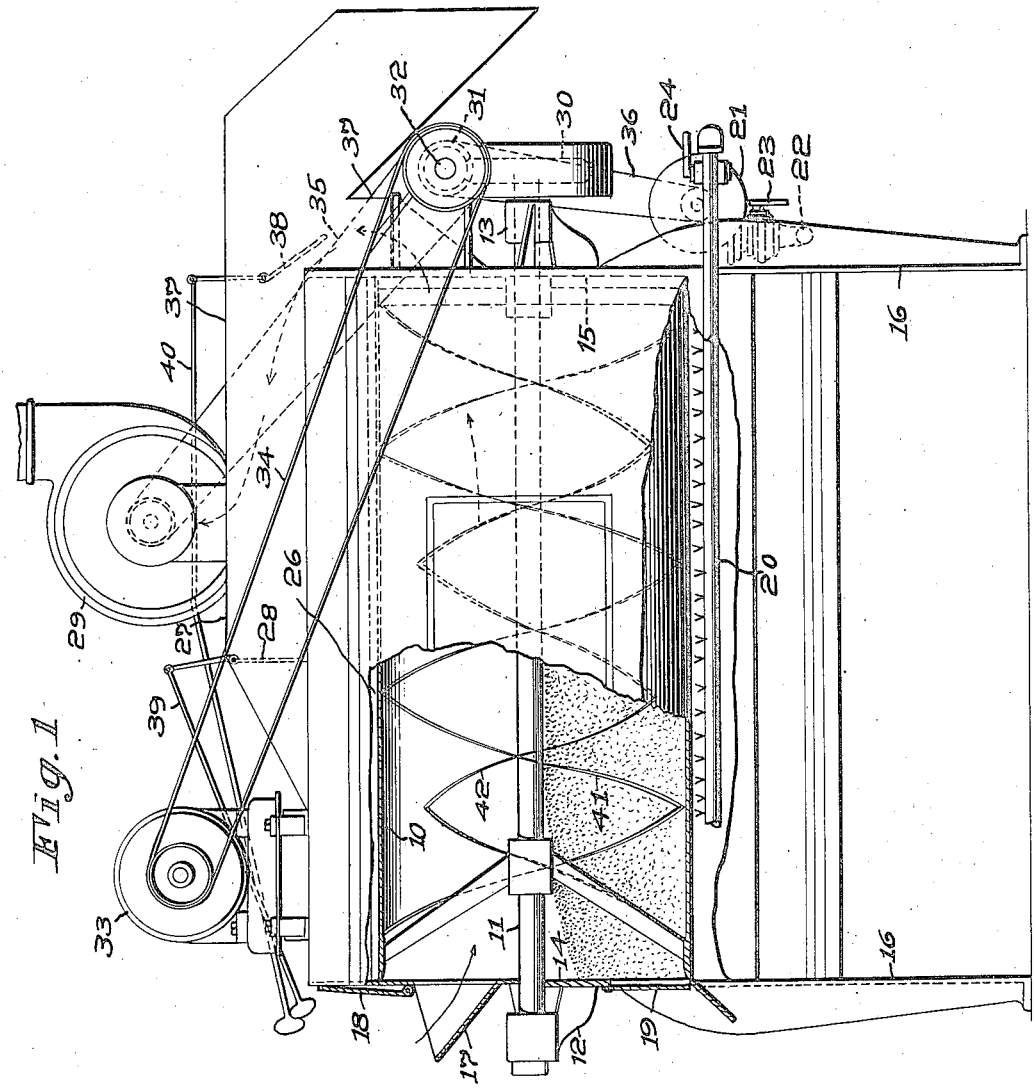
INVENTOR
David Chidlow
BY Robt. P. Hains
ATTORNEY July 10, 1923.
D. CHIDLOW
1,461,703
METHOD OF TREATING GRAIN GERM AND SCUTELLUM
Filed May 2, 1923
2 Sheets-Sheet 2
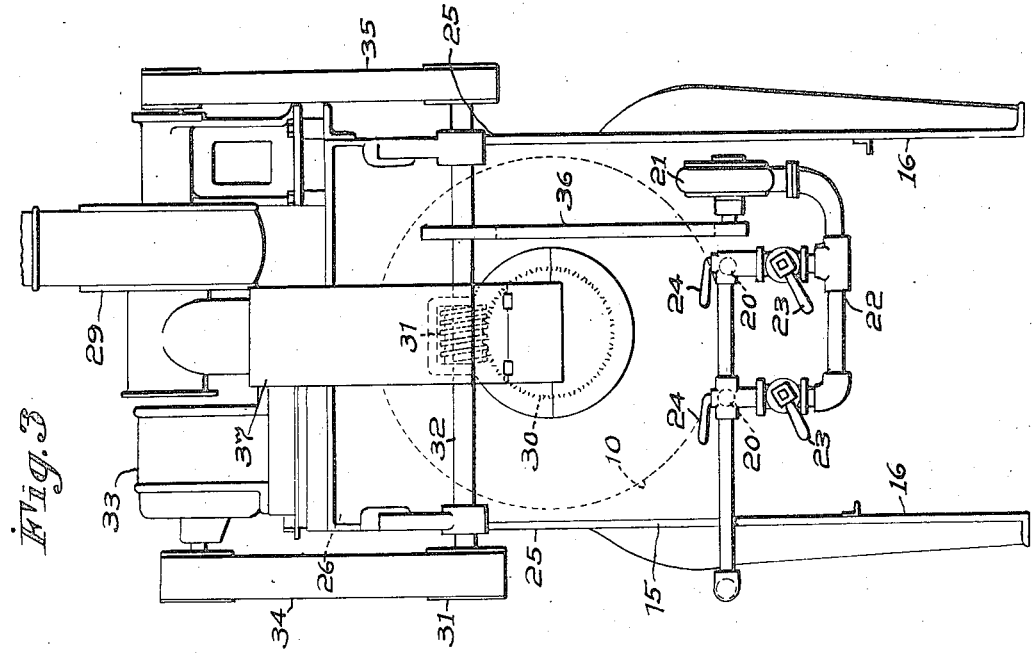
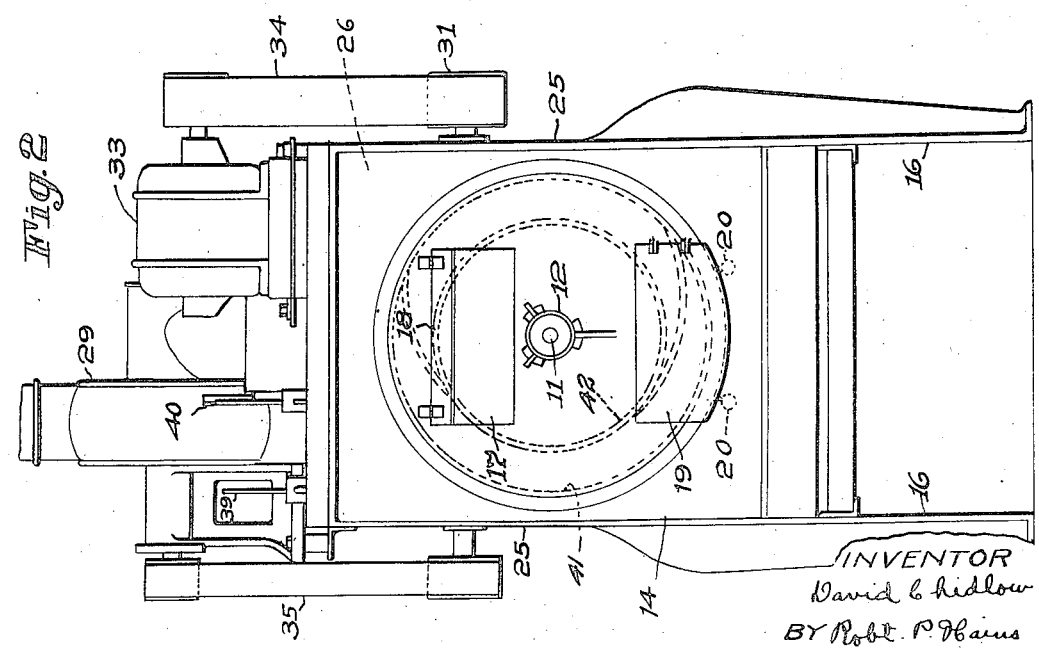
INVENTOR
David Chidlow
BY Robt. P. Hains
ATTORNEY Patented July 10, 1923.

1,461,703

UNITED STATES PATENT OFFICE.

DAVID CHIDLOW, OF RIDGEFIELD, CONNECTICUT, ASSIGNOR TO JAMES F. STRACHAN AND WILLIAM S. STRACHAN, BOTH OF MONTREAL, CANADA.

METHOD OF TREATING GRAIN GERM AND SCUTELLUM.

Application filed May 2, 1923. Serial No. 636,091.

*To all whom it may concern:*

Be it known that I, DAVID CHIDLOW, a subject of King George V of Great Britain, residing at Ridgefield, in the county of Fairfield and State of Connecticut, have invented an Improvement in Methods of Treating Grain Germ and Scutellum, of which the following description, in connection with the accompanying drawings, is a specification, like characters on the drawings representing like parts.

This invention relates to a new method or process of treating the germ and scutellum of grain to preserve the life sustaining vitamins which they contain, and the present application is a continuation in part of a prior application filed by applicant February 17, 1922, Serial No. 537,317.

It is now well known that the ordinary bread of commerce, such as wheat bread, for example, fails to support animal life without the addition of life sustaining vitamins through other foods. This is due to the elimination of the germ and scutellum from the grain flour during the manufacture of the flour, so that bread and other food products made from such flour do not contain sufficient (1) fat soluble vitamin A, (2) water soluble, antinueritic vitamin B, and (3) anti-scorbutic vitamin C, all of which are life sustaining properties and are found in the germ and scutellum (or tissue adjacent to and partly surrounding the germ).

Where, therefore, the principal source of food is the ordinary bread of commerce or as made in the home from grain flour, which has had the germ and scutellum removed, it is now necessary to supply the requisite life sustaining vitamins through other foods.

If the germ and scutellum are allowed to remain in the flour, it is found that they are rapidly changed by the oxygen of the air which destroys their vitamin value. Furthermore the germ and scutellum contain a bitter toxic substance which is unpalatable and is injurious to health if consumed in larger proportions than exists in the grain, and if it is attempted to make leavened bread from flour containing the raw germ and scutellum, the enzymes present in the germ and scutellum attack or digest the gluten of the flour during the period in which the dough, or sponge, is fermented, and as a result lowers the property of the gluten to expand and form a light commercial loaf.

It is found that the major portion of the vitamins contained in wheat are restricted to the germ and scutellum, and that the germ contains most of the fat-soluble vitamin A, while most of the water soluble vitamin B and anti-scorbutic vitamin C are contained in the scutellum. It is therefore desirable in practicing the present invention to use the germ and scutellum in about the same proportions that they exist in the grain, although the proportion of germ and scutellum used in making bread or other food products may be as high as desired.

It is quite possible to get practically pure wheat germ by sifting the ordinary mill commercial germ on a wire sieve having 16, 17 or 18 meshes to the inch, according to the mill product, which may flatten the germ into larger or smaller flakes or discs. It is apparent from the foregoing that the use of pure germ without the scutellum would practically exclude the vitally important vitamins B and C.

It has been attempted heretofore to increase the vitamins contained in bread by removing the germ and scutellum from the flour and adding them when the flour and other ingredients are mixed to form the usual dough or sponge. This has not proved satisfactory, because, when the germ and scutellum are removed from the grain they are attacked by the oxygen of the air and the vitamins they contain are destroyed.

Having the above matters in mind, the present invention contemplates a new method or process of treating the germ and scutellum of grain to preserve the life sustaining vitamins they contain so that these vitamins may be supplied in the bread of commerce and other foods made from flour.

In accordance with the present invention, the germ and scutellum are subjected to a heat treatment which serves to drive off the contained moisture, and to preserve the vitamins from the destructive action of the oxygen of the air. This heat treatment preferably comprises two operations, first, (*a*) heating the material to about 212° Fahrenheit to drive off the moisture with the aid of a gentle stream of air, then (*b*) shutting off the air supply to thereby keep in the heat and raise the temperature of the germ and scutellum to subject them to a final temperature which should not exceed 290° Fahrenheit, and preferably does not exceed 270° Fahrenheit.

In practice, the present method or process may be carried out by placing a charge of germ and scutellum in a rotating container, two hundred pounds being a convenient size charge, and applying heat to the outer wall of the container to heat the charge therein. The container is rotated to keep the material therein in motion to constantly change the particles exposed to contact with the heated wall, and stirring vanes may be placed in the container further to stir the material and heat it uniformly, and means is provided for passing air through the container.

In carrying out the first step (a) of the present method, sufficient heat is applied to bring the temperature of the material to about 212° Fahrenheit, usually within fifteen to twenty minutes, thereby driving off the 16 to 22 pounds of water normally contained in two hundred pounds of germ and scutellum, and a flow of air is maintained through the container during this stage to carry off the moisture. After the moisture is driven off the second step (b) of the method is carried out by cutting off the supply of air through the container to conserve the heat therein, and the temperature is raised until the temperature of the material as a mass reaches about 270° Fahrenheit, which ordinarily requires a further period of treatment of from 15 to 20 minutes. The total time of treatment (a) to drive off moisture, and (b) to complete the treatment at a higher temperature preferably ranges between 25 and 35 minutes depending upon the proportion of moisture present in the original mass, and the degree of heat applied to the rotating cylinder.

A low degree of heat during the period of driving off the moisture would require the air to be drawn through the mass for a longer period, thus promoting oxidation, and a consequent destruction of vitamins A and C, these vitamins being destroyed by oxygen more readily than vitamin B. On the other hand a high degree of heat would tend to char the material before the moisture could be evaporated, and a high temperature in the second stage (b) would raise the temperature of the mass to above 290° Fahrenheit, which is the maximum temperature to which the germ and scutellum may be subjected without danger of injuring or destroying the contained vitamins.

Since as above pointed out long exposure to low heat favors destruction of the vitamins by oxidation, while exposure to a high temperature also brings about destruction of vitamins, it is clear that the heating process should be accomplished in the shortest time consistent with a temperature low enough to prevent the treated material from reaching a maximum temperature of 290° Fahrenheit.

The application of heat in accordance with the present invention: (1) protects the germ and scutellum from oxidation when exposed to the destructive action of the air; (2) destroys the objectionable and bitter toxic substance present in the raw germ and scutellum; (3) renders the water-extractable bodies in the germ and scutellum less soluble so that the gluten in the flour will be less readily attacked during the fermentation of the dough or sponge by the enzymes in the germ and scutellum; and (4) renders the germ and scutellum less liable to rancidity. To accomplish these desired objects the germ and scutellum should be heated as above described, to bring the final temperature after the moisture is driven off, to a temperature above 240° Fahrenheit, but below 290° Fahrenheit.

One construction of a heating machine which has been used satisfactorily in carrying out the present invention, is disclosed in the accompanying drawings wherein;

Fig. 1 is a side elevation of the machine with parts shown in vertical section.

Fig. 2 is a front end view of the machine showing the relation of the vanes in dotted lines; and Fig. 3 is a rear end view of the machine.

The heating machine illustrated consists of a rotating metal cylinder 10 in which the material to be treated is placed, and this cylinder is secured to and rotated by the central shaft 11 which is journaled at its ends in the bearings 12 and 13 mounted upon the fixed end walls 14 and 15, the entire structure being supported by the downwardly extending legs 16 connected by suitable braces.

The ends of the cylinder 10 are closed by the vertical walls 14 and 15, and the cylinder ends terminate as close to the vertical walls as free rotation of the cylinder will permit, so that material is prevented from escaping between the ends of the cylinder and the walls 14 and 15. The charge to be treated is introduced into the cylinder through the hopper 17 secured to the wall 14, and which may be closed by a hinged door 18, and the cylinder may be discharged through a lower hinged door 19 within the wall 14.

The cylinder 10 and the charge therein are heated in the present device by burners 20 consisting of a pair of spaced pipes extending longitudinally below the cylinder and having holes or jets therein through which the fuel of combustion is discharged. In the construction shown air is supplied to the fuel under pressure, and to this end a small fan 21 is provided which supplies air under pressure to the burners through the pipe 22, and the supply of air to the burners may be controlled by adjusting the valves 23, while the supply of fuel may be controlled by adjusting the valves 24. The burning gases pass upwardly around the curved walls of the cylinder 10 and between the cylinder and the outer walls 25 of the machine, and the burnt gases collect in the chamber 26 above the rotating cylinder and escape from this chamber through a conduit 27 having a gate or damper 28 therein for controlling the passage of the burnt gases therethrough. The conduit 27 leads to the suction side of a fan 29, and removal of the burnt gases within the chamber 26 and about the cylinder 10 is controlled by adjusting the damper 28.

The shaft 11 which serves to support and rotate the cylinder 10 is driven by a gear 30 meshing with a worm 31 secured to a transversely extending shaft 32, and this shaft is driven by an electric motor 33 mounted upon the present machine and which operates the shaft 32 through a belt 34. The fan 29 is driven from the shaft 32 by a belt 35, and the small fan 21 for supplying air to the burners is driven from the shaft 32 by a belt 36.

It is important that a circulation of air be maintained through the cylinder 10 during the operation of heating the charge therein to remove the moisture, and this is accomplished by providing a conduit 37 which leads from the wall 15 to the suction side of the fan 29, and serves to draw air through the container 10 as indicated by the arrows, and air may enter the opposite end of the cylinder 10 through the chute 17. After the moisture of the charge within the container has been removed sufficiently, the door 18 of the chute 17 may be closed and a gate or damper 38 within the conduit 37 is closed to shut off communication between the interior of the chamber 10 and the suction fan. The gates or dampers 28 and 38 may be manually adjusted by the rods 39 and 40 extending from the respective dampers to the front end of the machine.

It is important that the material within the cylinder 10 be stirred continuously, and this is accomplished by rotating the cylinder to constantly change the particles exposed to the wall thereof, and this is further accomplished by providing two sets of spirally disposed vanes 41 and 42 within the cylinder, one of which is supported inside the other, and the vane 41 which surrounds the other vane, preferably serves to direct the materials in the cylinder toward the discharge door 19 thereof, whereas the inner vane 42 serves to advance the material longitudinally of the cylinder in the opposite direction. The construction is such that the material within the cylinder and adjacent the wall of the cylinder is moved longitudinally thereof in one direction, while the material near the central axis of this cylinder is moved longitudinally of the cylinder in the opposite direction.

In using the machine disclosed for treating germ and scutellum in accordance with the present invention, the door 18 and the damper 38 are maintained open during the operation of driving off the moisture from the germ and scutellum, and the door and damper are maintained closed during the second step of the process which consists in raising the temperature of the charge the desired amount.

The heating machine shown and described is not a part of the present invention and is therefore not claimed.

After the germ and scutellum have been treated in accordance with the present invention, they may be kept in bulk or containers for as long a period as desired before using them, and they may be ground into flour and then introduced in the desired proportion into the bread compound or other food product and cooked therewith.

What is claimed is:

1. The method or process of preserving the germ and scutellum of grain and the life sustaining vitamins contained therein, which consists in heating the germ and scutellum to a sufficiently high temperature and for a sufficient period of time to render the germ and scutellum invulnerable to the destructive action of the air while maintaining the heat below a temperature sufficient to destroy the vitamins in the germ and scutellum.

2. The method or process of preserving the life sustaining vitamins contained in the germ and scutellum of grain, which consists in heating the germ and scutellum to a temperature of not more than 290 degrees Fahrenheit for a sufficient period of time to preserve unimpaired the vitamins contained therein.

3. The method or process of preserving the life sustaining vitamins contained in the germ and scutellum of wheat, which consists in heating the germ and scutellum to a temperature of about 270 degrees Fahrenheit for a sufficient period of time to render the germ and scutellum invulnerable to the destructive action of the air.

4. The method or process of preserving the life sustaining vitamins contained in the germ and scutellum of grain, which consists in heating the germ and scutellum sufficiently to render them invulnerable to the destructive action of the air without destroying the vitamins in the germ and scutellum.

5. The method or process of treating the germ and scutellum of wheat, which consists in heating the germ and scutellum to a temperature between 240 degrees Fahrenheit and 290 degrees Fahrenheit, maintaining the germ and scutellum at this temperature for a sufficient length of time to render the germ and scutellum substantially invulnerable to the destructive action of the air and to destroy the bitter toxic substance present in the raw germ and scutellum but terminating this temperature before the vitamins in the germ and scutellum are impaired or destroyed.

6. The method or process of preserving the life sustaining vitamins contained in the germ and scutellum of grain, which consists, (a) in driving off the moisture of the germ and scutellum by heating them to about 212 degrees Fahrenheit and carrying off the moisture by a gentle stream of air, and (b) arresting the stream of air and raising the temperature of the germ and scutellum to a final temperature of about 270 degrees Fahrenheit.

7. The method or process of preserving the life sustaining vitamins contained in the germ and scutellum of grain, which consists, (a) in driving off the moisture of the germ and scutellum by heating them and carrying off the moisture by a gentle stream of air, and (b) arresting the stream of air and raising the temperature to a sufficient degree to render the germ and scutellum invulnerable to the destructive action of the air while maintaining the heat below a temperature which will destroy the vitamins in the germ and scutellum.

In testimony whereof, I have signed my name to this specification.

DAVID CHIDLOW.